US010406591B2

(12) United States Patent
Schellin et al.

(10) Patent No.: US 10,406,591 B2
(45) Date of Patent: Sep. 10, 2019

(54) SPHERICAL DECOUPLER CONDUIT

(71) Applicant: Nelson Global Products, Inc., Stoughton, WI (US)

(72) Inventors: Robert Schellin, Stoughton, WI (US); Dennis Richard Mevissen, Waconia, MN (US); Attila Stephens, Madison, WI (US)

(73) Assignee: Nelson Global Products, Inc., Stoughton, WI (US)

( * ) Notice: Subject to any disclaimer, the term of this patent is extended or adjusted under 35 U.S.C. 154(b) by 1076 days.

(21) Appl. No.: 14/815,118

(22) Filed: Jul. 31, 2015

(65) Prior Publication Data

US 2017/0030500 A1    Feb. 2, 2017

(51) Int. Cl.
| | |
|---|---|
| *B21J 5/02* | (2006.01) |
| *B21J 5/04* | (2006.01) |
| *B21D 39/20* | (2006.01) |
| *B21D 39/04* | (2006.01) |
| *B23P 11/02* | (2006.01) |

(Continued)

(52) U.S. Cl.
CPC .............. *B21J 5/02* (2013.01); *B21D 26/033* (2013.01); *B21D 39/04* (2013.01); *B21D 39/046* (2013.01); *B21D 39/203* (2013.01); *B21D 39/206* (2013.01); *B21J 5/04* (2013.01); *B23P 11/022* (2013.01); *F01N 1/00* (2013.01); *F16L 27/026* (2013.01); *F16L 27/04* (2013.01); *B21D 26/02* (2013.01); *Y10T 29/49805* (2015.01)

(58) Field of Classification Search
CPC .. B21D 26/033; B21D 39/203; B21D 39/206; B21D 15/10; B21D 39/04; B21D 39/046; B21J 5/025; B21J 5/04; F16L 27/026; F16L 27/04; B23P 11/022
See application file for complete search history.

(56) References Cited

U.S. PATENT DOCUMENTS 3,611,768 A * 10/1971 Odakagi ................ B21D 15/06
                                                            72/58
4,069,573 A *  1/1978 Rogers, Jr. ........... B21D 22/105
                                                            138/98

(Continued)

FOREIGN PATENT DOCUMENTS

| DE | 2814433 A1 * | 10/1978 | ........... B21D 22/105 |
| DE | 102013105481 A1 * | 12/2014 | ........... B21D 39/206 |

OTHER PUBLICATIONS

Photograph 1, Photograph of a prior art spherical decoupler, Oct. 2005.

(Continued)

*Primary Examiner* — Jermie E Cozart
(74) *Attorney, Agent, or Firm* — Smith Law Office; Jeffry W. Smith

(57) ABSTRACT

A spherical decoupler conduit for connecting misaligned components, and a method for making the same, where the spherical decoupler includes an inlet connection with a first spherical portion; an outer slider with a second spherical portion for pivotably mating with the first spherical portion and a tubular portion; an inner slider having a tubular portion in a telescoping relationship with the tubular portion of the outer slider and a third spherical portion; and an outlet connection with a fourth spherical portion for pivotably mating with the third spherical portion.

8 Claims, 13 Drawing Sheets

(51) Int. Cl.
*B21D 26/033* (2011.01)
*F16L 27/02* (2006.01)
*F16L 27/04* (2006.01)
*B21D 26/02* (2011.01)
*F01N 1/00* (2006.01)

(56) References Cited

U.S. PATENT DOCUMENTS

| | | | | |
|---|---|---|---|---|
| 4,484,756 | A | * | 11/1984 | Takamiya ............ B21D 26/037 |
| | | | | 280/281.1 |
| 4,513,598 | A | * | 4/1985 | Costabile ............ B21D 26/043 |
| | | | | 29/421.1 |
| 4,567,631 | A | * | 2/1986 | Kelly ................... B21D 39/203 |
| | | | | 29/237 |
| 5,233,855 | A | * | 8/1993 | Maki ................... B21D 22/105 |
| | | | | 29/421.1 |
| 2006/0082142 | A1 | * | 4/2006 | Berchtold ........... F01N 13/1827 |
| | | | | 285/261 |

OTHER PUBLICATIONS

Photograph 2, Photograph of a prior art spherical decoupler, Oct. 2005.
Photograph 3, Photograph of a prior art spherical decoupler, Oct. 2005.
Photograph 4, Photograph of a prior art spherical decoupler, Oct. 2005.
Photograph 5, Partial side view of a spherical decoupler part interface, Oct. 2005.
Photograph 6 Partial side view of a spherical decoupler part interface, Oct. 2005.
Photograph 7, Partial side view of a spherical decoupler part interface, Oct. 2005.
Photograph 8, Partial side view of a spherical decoupler part interface, Oct. 2005.

* cited by examiner

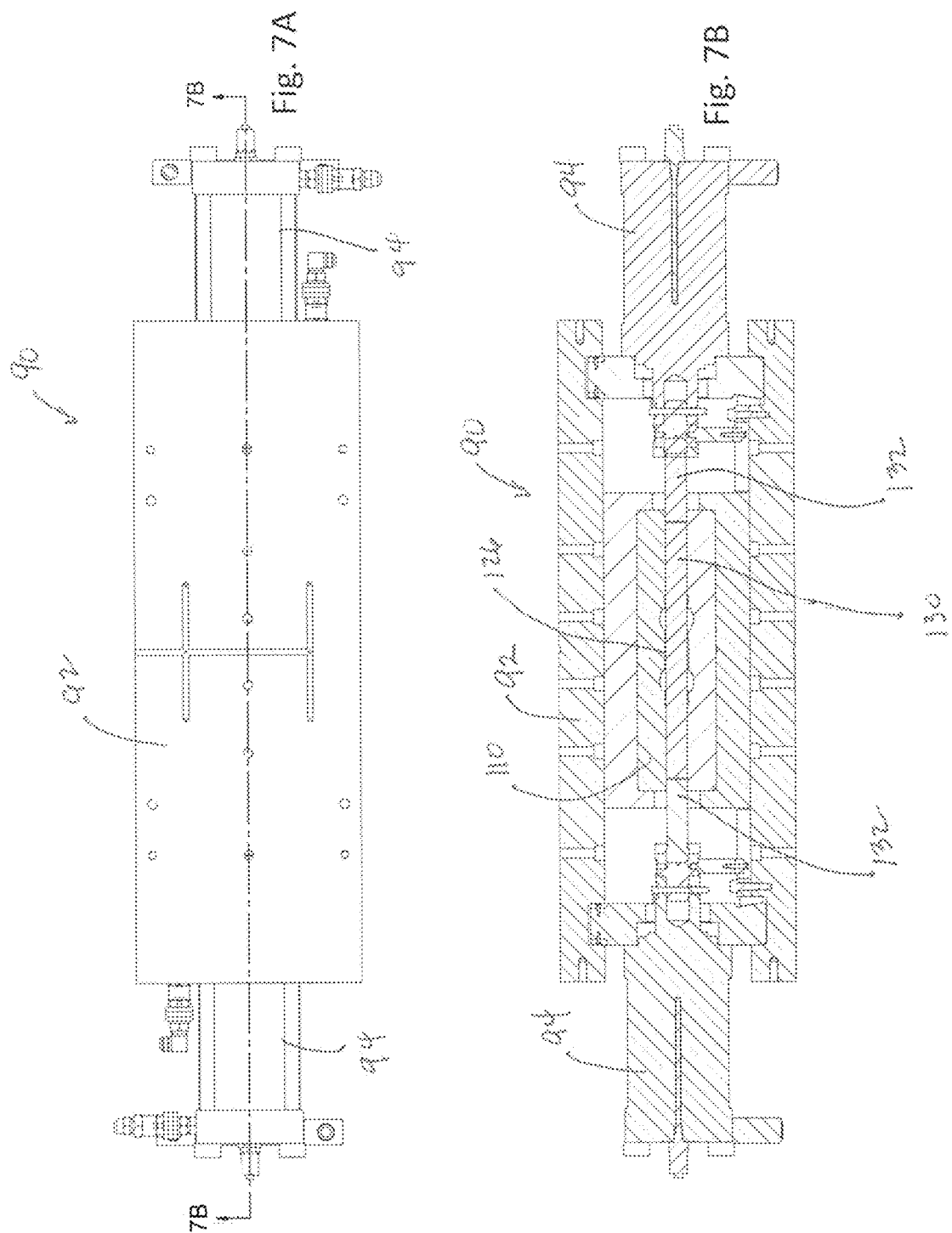

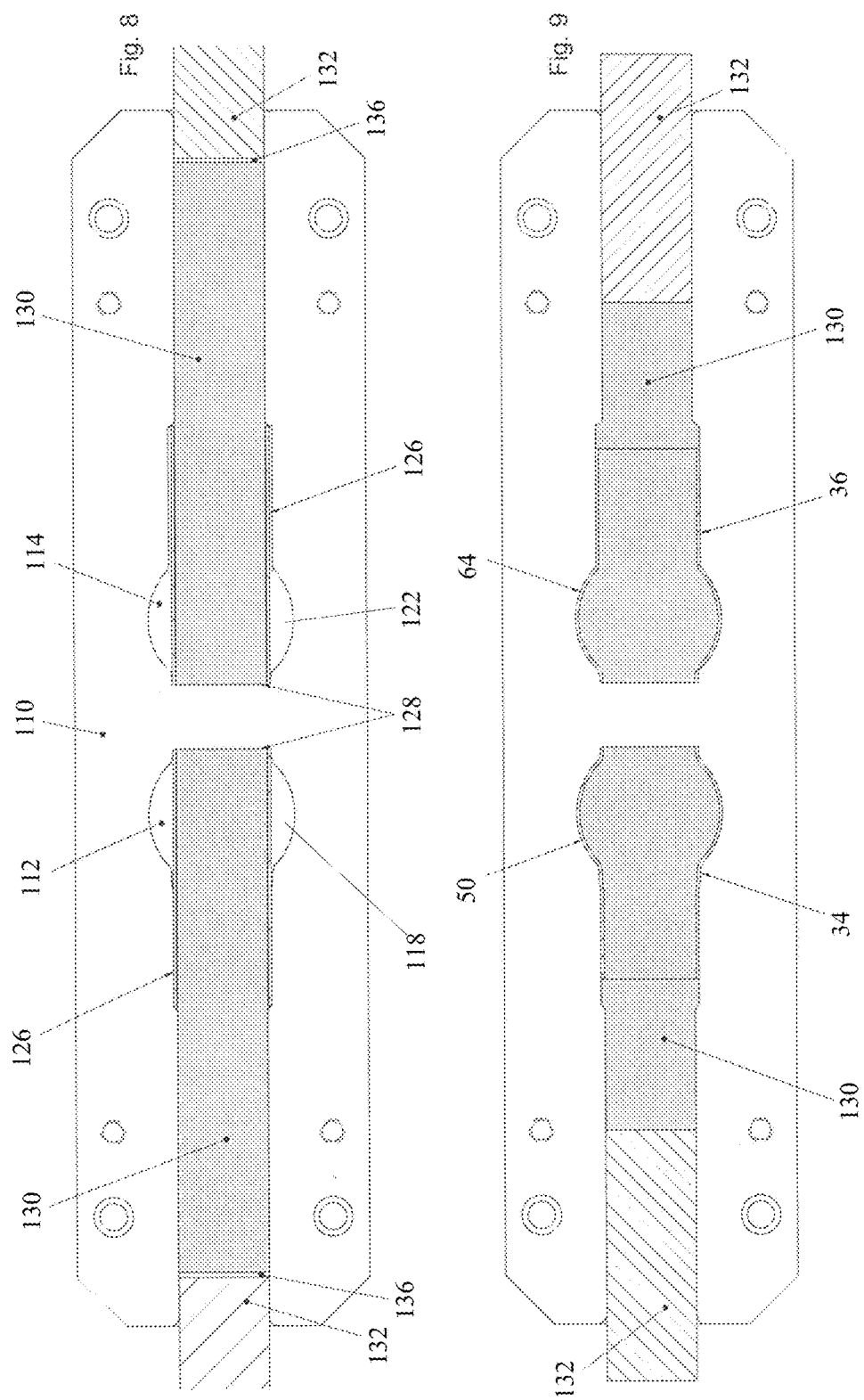

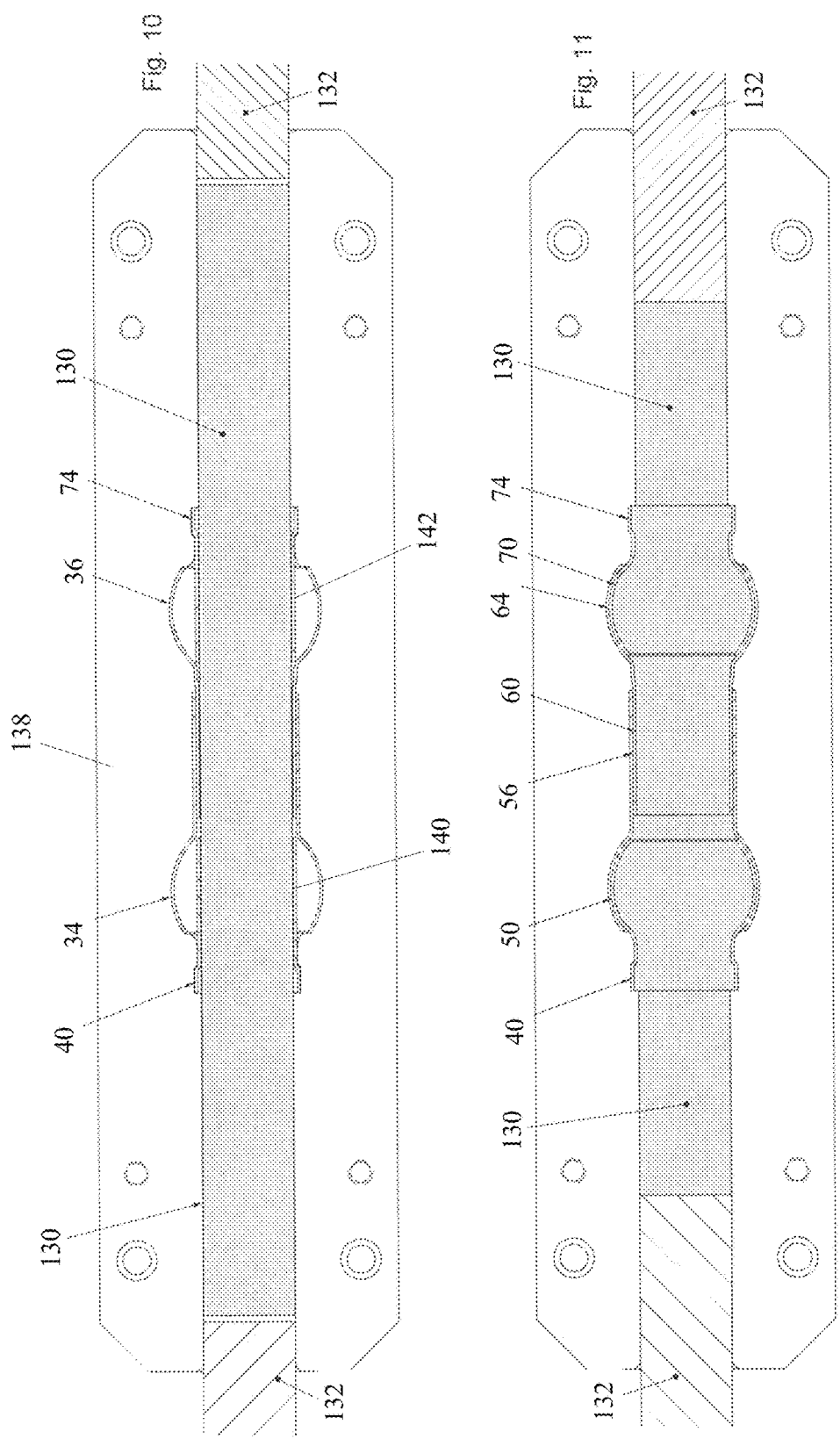

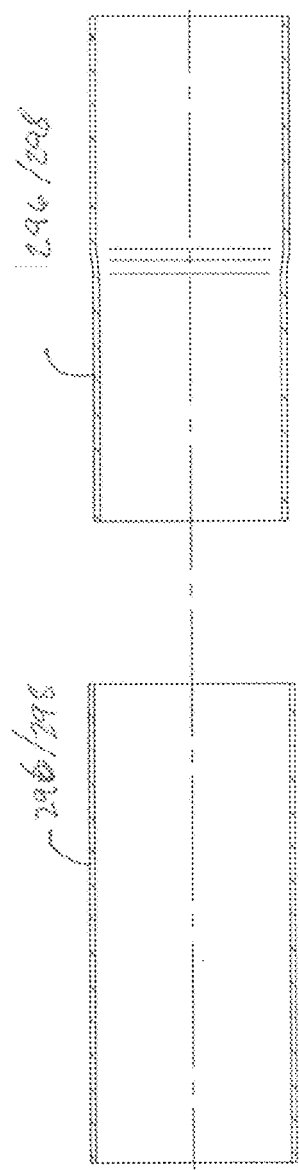
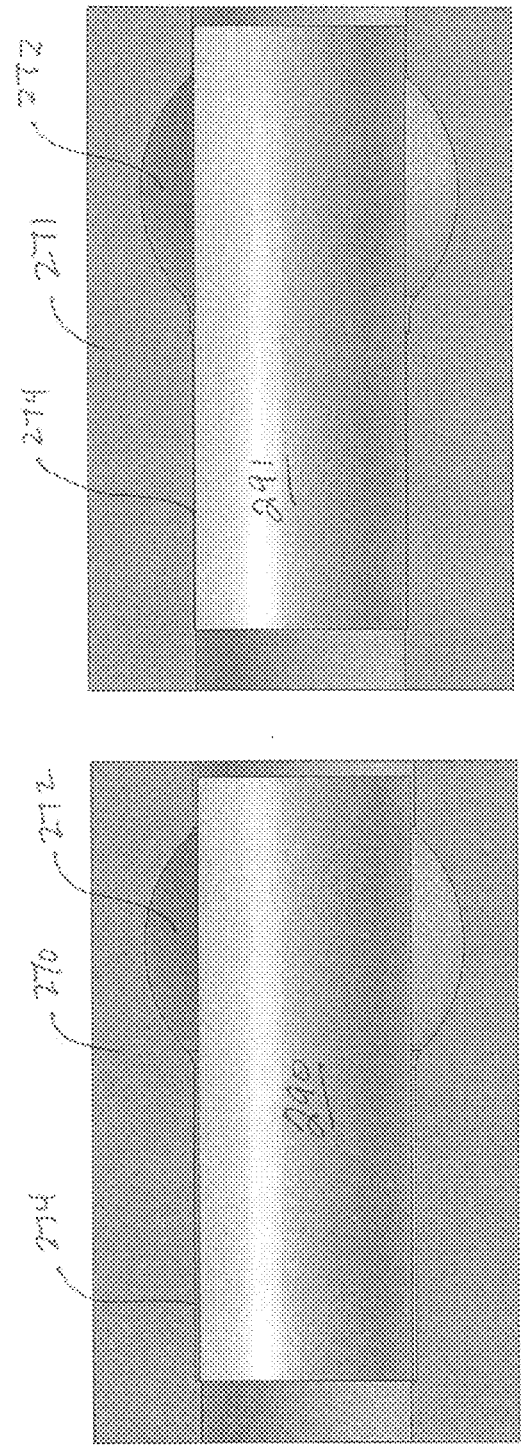
Fig. 18
Fig. 19

SPHERICAL DECOUPLER CONDUIT

FIELD AND BACKGROUND OF THE INVENTION

This invention relates generally to conduit joints for misaligned or flexing conduits, and more particularly to a spherical decoupling joint for misaligned conduits.

Joining conduits is common in many products and systems, including vehicle exhaust systems that extend between an engine exhaust and an exhaust aftertreatment system such as a selective catalytic reaction system, ("SCR"). Ideally, the engine exhaust and the inlet to an exhaust aftertreatment system would be perfectly aligned and at a constant spacing during assembly and use. Nonetheless, in practice, the engine exhaust and aftertreatment device inlet are seldom aligned, and during use rarely at a constant spacing. Further, bellows permit only a very limited amount of rotational movement. The degree of rotational or twist provided by a bellows connection is as little as one degree.

To accommodate offsets, variable and changing spacing, and vibrations, it has been accepted in the industry to us a bellows-type conduit with folds that flex to accommodate misalignment and differential spacing. Bellows systems overcome these problems, but are expensive to manufacture, install, maintain, and replace.

It has been proposed to use a spherical telescoping joint to accommodate misaligned conduits and variable spacing. The spherical portion of the joint included a pair of spaced apart spherical joints each having a male portion fit into a female portion, and both have mating spherical surfaces that can pivot relative to one another to accommodate misalignment. Between the spherical joints is another telescoping joint to accommodate variable spacing between the components and vibrations. Such a joint is practical in theory, but known manufacturing methods render the joints impractical because of poor fit, leaks, high friction between joint parts and high manufacturing costs. These problems are exacerbated when such a joint is used in high-temperature and rugged environments, such as vehicle exhaust systems.

Thus, there is a need for a reliable and well-sealed conduit joint that accommodates misalignment, variable spacing, vibrations, and high temperatures that is relatively inexpensive to manufacture.

SUMMARY OF THE INVENTION

To overcome the shortcomings of prior conduit joints, the present invention includes: an inlet connection having a tubular conduit portion and a male spherical portion; and outer slider having a female spherical portion in which the male spherical portion of the inlet connection is at least partially disposed, and a female tubular portion; an inner slider having a male tubular portion disposed at least partially inside of the female tubular portion of the outer slider, and a female spherical portion; and an outlet connection having a male spherical portion disposed at least partially in the female spherical portion of the inner slider, and a tubular conduit portion.

The female spherical portion of the outer slider can be shaped to limit the degree to which the male portion of the inlet connection can pivot. Similarly, the female spherical portion of the inner slider can be shaped to limit the degree to which the male portion of the outlet connection can pivot. In addition, the outlets of the male and the inlets of the female spherical portions can be sized to control the size of the passage way between sections.

The tubular inlet conduit portion can be shaped to connect to an engine exhaust. The tubular outlet conduit portion can be shaped to connect to an exhaust treatment device. These inlets and outlets can be formed using any suitable manufacturing method.

The present invention is also directed to a method for forming a spherical decoupling joint, and the method includes the steps of: positioning a first conduit blank in a first forming die, and the first forming die includes a tubular recess portion and a spherical recess portion; at least partially restraining a second conduit blank in a second forming die, and a second forming die defines a tubular recess portion and a spherical recess portion; inserting a flexible material in the first conduit blank; compressing the flexible material to force the flexible material against the first conduit blank to force a portion of the first conduit blank outward into engagement with the tubular recess portion of the first die, and another portion of the first conduit blank outward into contact with the spherical recess portion of the first forming die to form an outer slider having a tubular portion and a spherical portion; inserting a flexible material in the second conduit blank; compressing the flexible material to force the flexible material against the second conduit blank to force a portion of the second conduit blank outward into engagement with the tubular recess portion of the second die, and another portion of the second conduit blank outward into contact with the spherical recess portion of the second forming die to form an inner slider having a tubular portion and a spherical portion; inserting the tubular portion of the inner slider into the tubular portion of the outer slider to form a subassembly; inserting a third conduit blank at least partially into the outer slider; inserting a fourth tube conduit blank at least partially into the inner slider; placing the subassembly, the third conduit blank, and the fourth conduit blank into a third die, and the third die defines a recess substantially matching the shape of the subassembly; inserting a flexible material into the third conduit blank and the fourth conduit blank; compressing the flexible material against the third conduit blank to; expand a portion of the third conduit blank outward into engagement with at least a portion of the outer slider to form a connection inlet, and against the fourth conduit blank to expand at least a portion of the fourth conduit outward into engagement with at least a portion of the inner slider to form a connection outlet; and removing the spherical decoupling conduit joint from the third die.

Also in accordance with the present invention, there is provided a spherical decoupler defining a conduit, the spherical decoupler including a first conduit having an inlet and an outlet in a first spherical portion, and a second conduit having an inlet in a second spherical portion and an outlet, and the second spherical portion is pivotably engaged with the first spherical portion.

The first spherical portion can also be rotationally engaged with the second spherical portion, and the first spherical portion can be at least partially disposed in the second spherical portion.

The spherical decoupler can also include: a first sliding portion joined to the second spherical portion; and a second sliding portion in a slidably disposed in first sliding portion. Further, the spherical decoupler can include a third spherical portion joined to the second sliding portion; and a fourth spherical portion pivotably engaged with the third spherical portion.

One alternative embodiment of the spherical decoupler can have an outlet in the first conduit that is open when the first conduit and the second conduit are substantially axially aligned, and the outlet is at least partially closed when the first conduit and the second conduit are not substantially axially aligned.

BRIEF DESCRIPTION OF THE DRAWINGS

FIG. 7A is a side view of a forming machine for manufacturing spherical decoupler in accordance with the present invention;

FIG. 7B is a cross sectional view of the forming machine taken along line 7B-7B in FIG. 7A;

FIG. 8 is a cross-sectional view of an initial arrangement of components in a Stage 1 of a forming process in accordance with the present invention;

FIG. 9 is a cross-sectional view of a final arrangement of the components in FIG. 8 in Stage 1 of the forming process;

FIG. 10 is a cross-sectional view of an initial arrangement of components in a Stage 2 of the forming process;

FIG. 11 is a cross-sectional view of a final arrangement of the components of FIG. 10, in Stage 2 of the forming process;

FIG. 18 is a side cross sectional view of a pair of conduit blanks with one of the conduit blanks in an expanded, pre-formed state;

FIG. 19 is a side view of a pair of conduit blanks before shaping in an alternate forming method in accordance with the present invention;

DETAILED DESCRIPTION OF THE DRAWINGS

Figure 1:
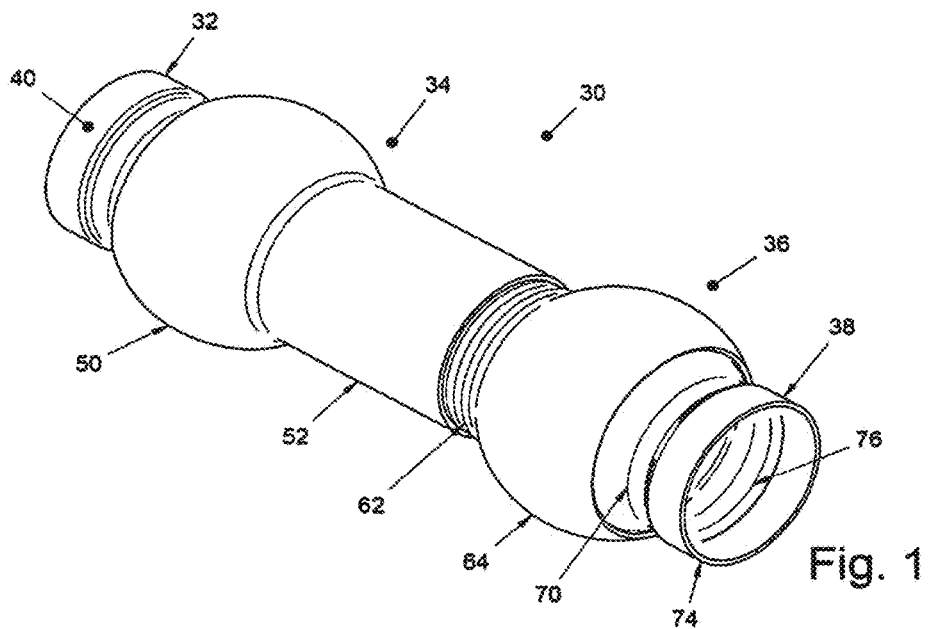
FIG. 1 is a perspective view of a spherical decoupler of the present invention in a collapsed and aligned position.
Figure 2:
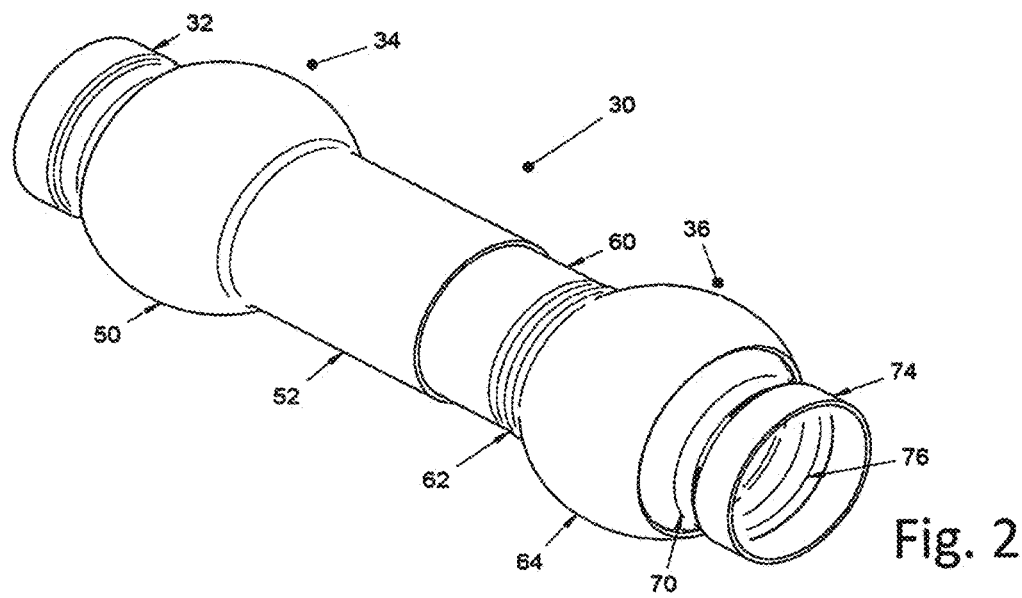
FIG. 2 is a perspective view of the spherical decoupler of FIG. 1 in an extended and aligned position.
Figure 3:
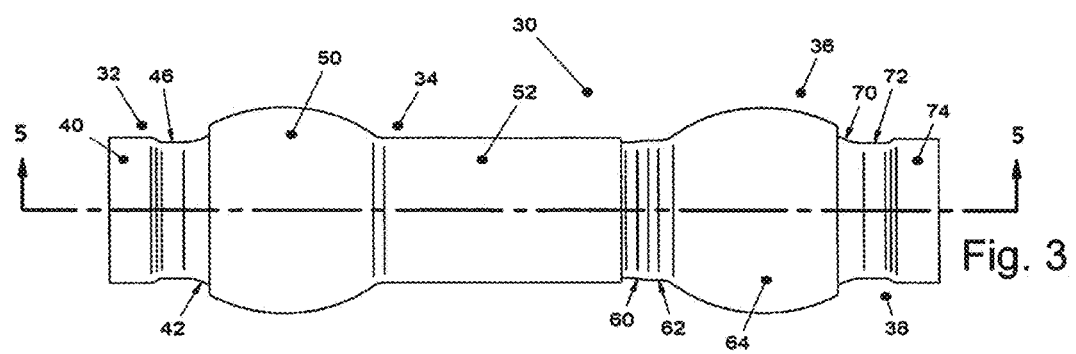
FIG. 3 is a side view of the spherical decoupler of FIG. 1 in a collapsed and aligned position.
Figure 4:
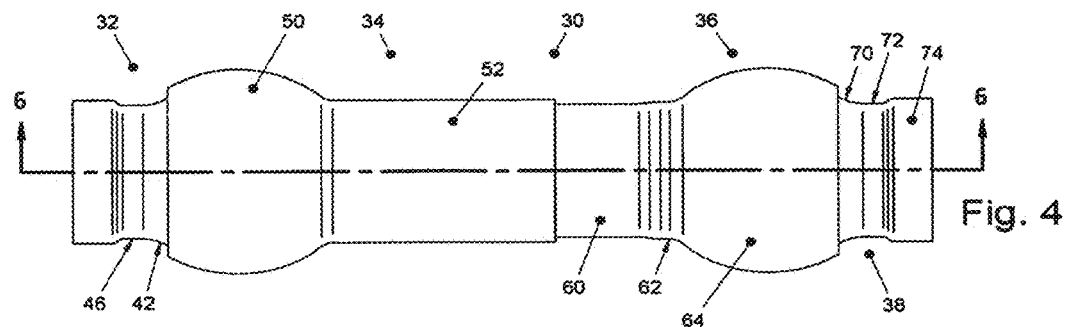
FIG. 4 is a side view of the spherical decoupler of FIG. 1 in an extended and aligned position.
Figure 5:
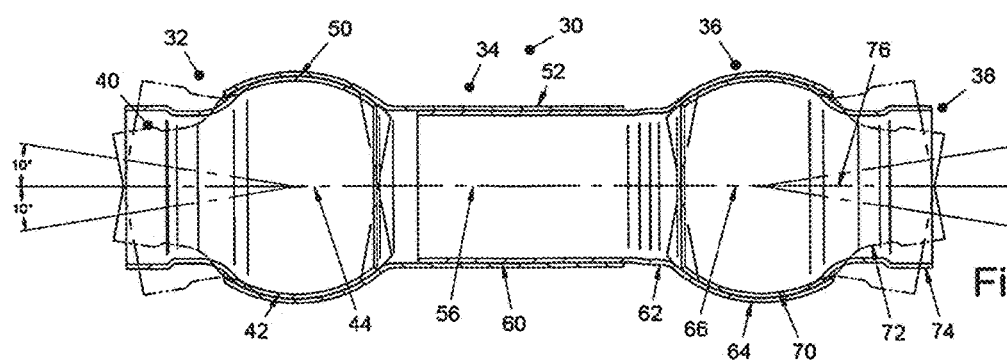
FIG. 5 is a cross-sectional view of the spherical decoupler of FIG. 3 and illustrating multiple alignment positions.
Figure 6:
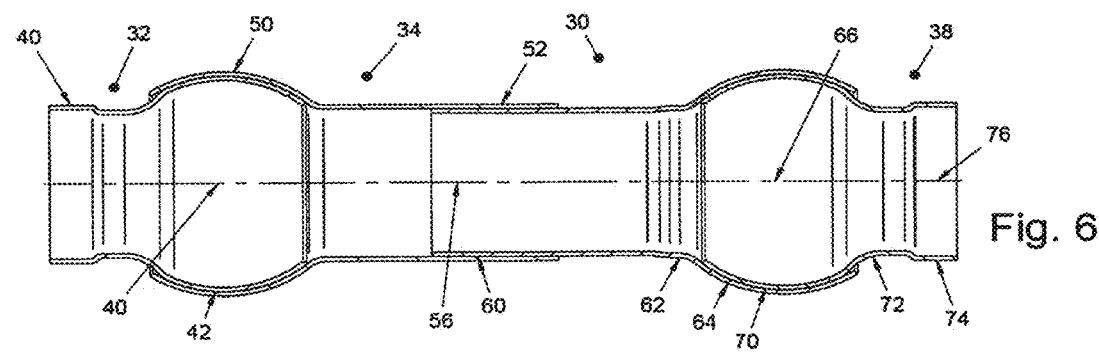
FIG. 6 is a cross-sectional view of FIG. 4 in an extended and aligned position.
Figure 12:
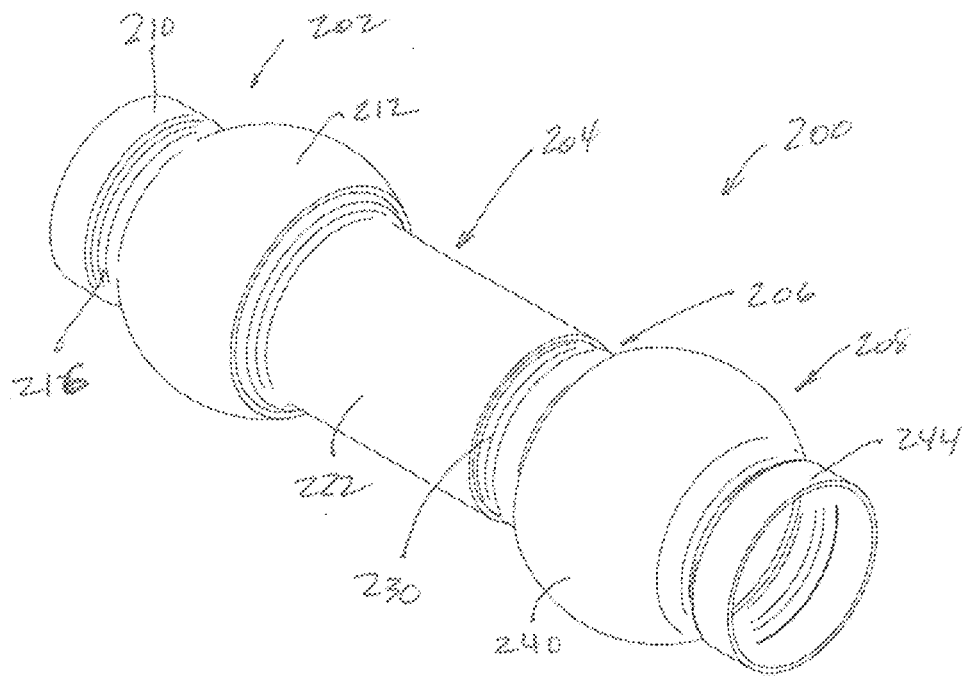
FIG. 12 is a perspective view of an alternate-embodiment of a spherical decoupler of the present invention in a collapsed and axially aligned position.
Figure 13:
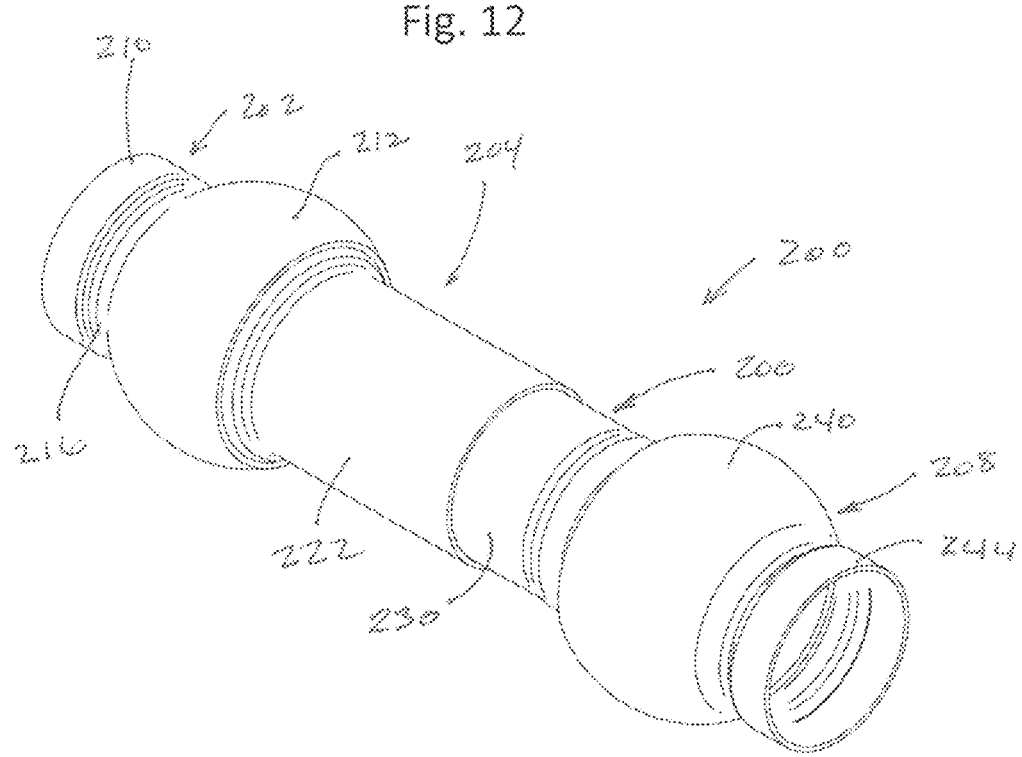
FIG. 13 is a perspective view of the spherical decoupler of FIG. 12 in an extended and aligned position.
Figure 14:
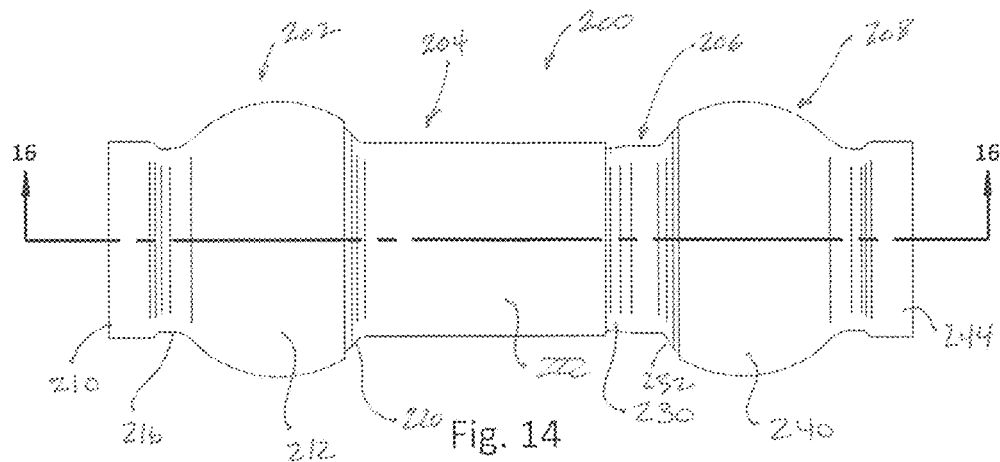
FIG. 14 in a side view of the spherical decoupler of FIG. 12 is a collapsed and axially aligned position.
Figure 15:
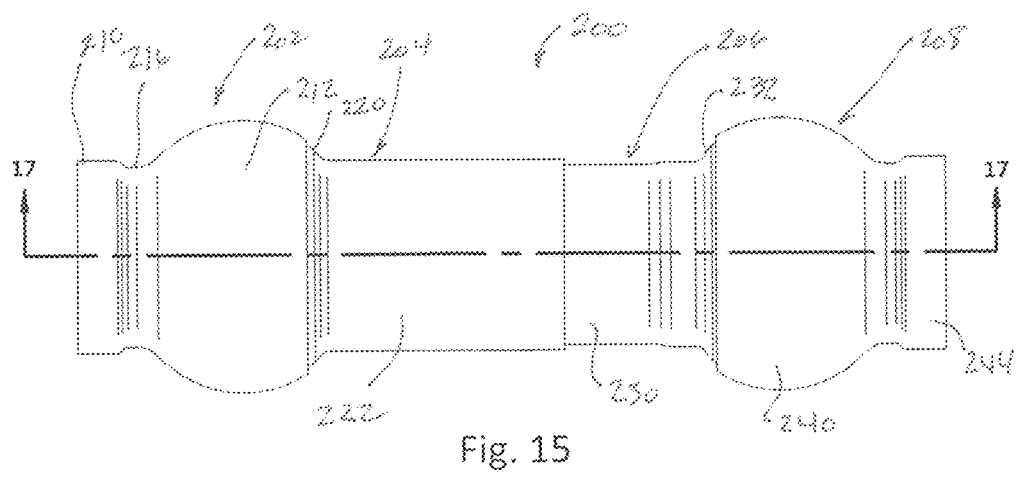
FIG. 15 is a side view of the spherical decoupler of FIG. 13 in an extended and axially aligned position.
Figure 16:
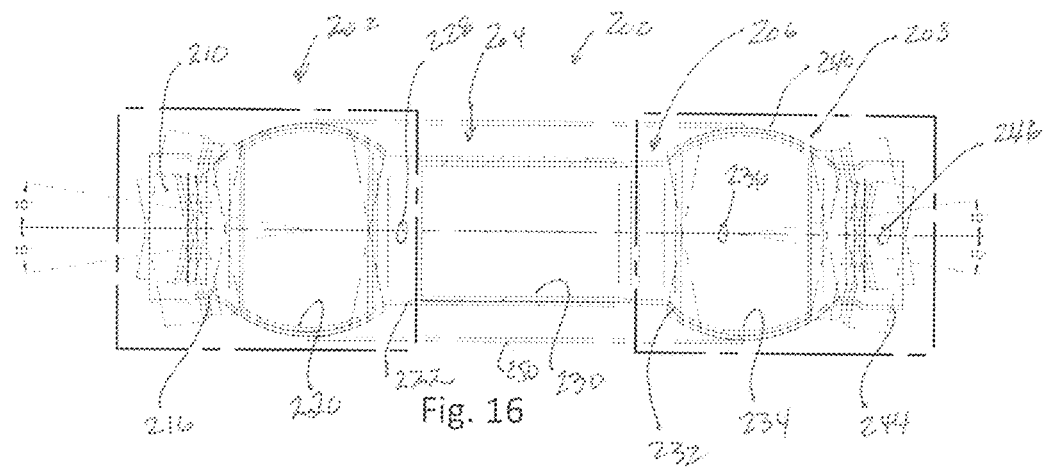
FIG. 16 is a cross sectional view of the spherical decoupler taken along line 16-16 in FIG. 14.
Figure 17:
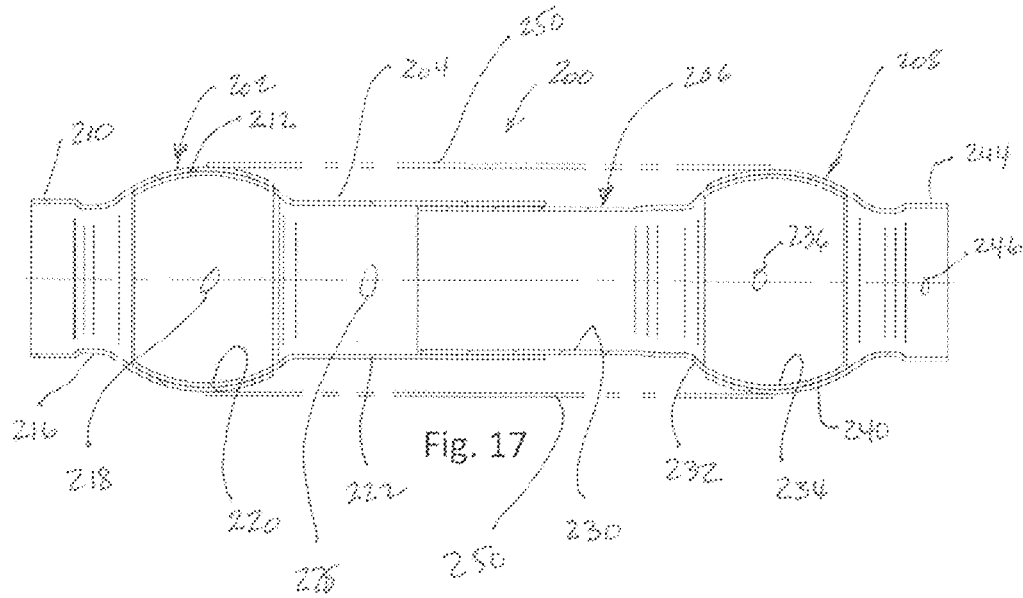
FIG. 17 is a cross sectional view of the spherical decoupler taken along line 17-17 in FIG. 15.

In the following detailed descriptions of drawings, the same reference numeral will be used to identify the same or similar elements for each of the drawings.

Illustrated generally in FIGS. 1 through 6 is a spherical decoupler joint 30 in accordance with the present invention. From left to right as illustrated, the spherical decoupling joint 30 includes an inlet connection 32, an outer slider 34, an inner slider 36, and an outlet connection 38. The inlet connection 32 at the left and the outlet connection 38 at the right, are simply names for opposite ends of the spherical decoupler 30, and the arrangement can be reversed or the spherical decoupler 30 could be arranged at any desired orientation between horizontal (as illustrated) and vertical.

The cross-sectional shape of the elements of the spherical decoupler 30 is preferably round for the greatest degree of sliding, pivoting, and rotational movement of adjacent parts, but the cross sections of various parts could be out-of-round, if desired, or include appropriate stops to limit the degree of relative pivoting, sliding, and rotational movement of adjacent parts. Further, as described in more detail below in relation to FIGS. 22 through 24, the degree of relative pivoting movement can be used to control fluid flow through the spherical decoupler 30.

The inlet connection 32 is preferably shaped and sized to mate with an engine exhaust (not illustrated), and to accommodate any type of desired connector, such as a clamp, beaded joint (Marmon-type), or other connector type consistent with the intended use of the spherical decoupler 30. The inlet connection 32, as well as the other parts described herein, preferably have wall thicknesses that are essentially the same thickness as the original conduit blank from which the parts were formed. Nonetheless, different wall thicknesses can be formed into the completed parts. The outer surface of the male spherical outlet portion 42 is preferably free of tool marks, and manufactured to tight tolerances for mating closely with other parts. The inlet 40 is illustrated in FIGS. 3 through 6, for example, with an enlarged diameter that can be formed using any suitable method. Further, this diameter sizing can be performed on any desired components described herein.

The inlet connection 32 defines a conduit 44 extending from the inlet 40 to the outlet 42 through which exhaust or other gas can flow at high temperatures and at pressures associated with exhaust gases, for example.

The outlet 42 can be sized, positioned, or shaped to control flow characteristics through the spherical decoupler 30. Further, these outlet 42 characteristics can be used advantageously with a related spherical component to control internal flow as the spherical decoupler 30 moves between an axially aligned position and an axially unaligned position. One example of such a feature is described in relation to FIGS. 23 through 25.

A neck 46 can also be formed in the inlet connection 32 to provide ample movement for pivoting movement of an adjacent outer slider 34, as described below.

The outer slider 34 includes a female spherical inlet portion 50 that is at least partially surrounding the male outlet portion 42 of the inlet connection 32. The inner surface of the female spherical inlet portion 50 is preferably very smooth and with only minimal tool marks, so that it fits in a relatively tight mating relationship with the male spherical outlet portion 42.

The female spherical portion 50 transitions into a substantially straight female axial slide portion 52, which has any desired length and shape to fit the application. For example, the preferred cross-sectional shape is round, but the female axial slide 52 could be square or any other out-of-round shape to prevent rotation (if desired) of the outer slider 34 relative to the inner slider 36. In addition, other shapes, including elbows could be included between the female spherical portion 50 and the female axial slide portion 52. Again, the female slide portion 56, like all of the parts described herein, should be relatively free of tool marks that can reduce friction and poor fit.

The outer slider 34 defines a conduit 58 extending through the female spherical inlet portion 48 and the female axial slide portion 52.

Disposed at least partially inside the female slide portion 52 is a male slide portion 60 of the inner slider 36. These parts can slide axially and also rotate relative to one another to accommodate vibration and variable spacing of related parts, both during assembly and after installation. The length, diameter, and cross-sectional shape of the male slide portion 60 is selected to match the female axial slide portion 52. In some embodiments, the parts are sized to provide at least one inch of sliding (or telescoping) movement, but other lengths of movement are possible.

To the right (as illustrated) of the male slide portion 60 is an optional shoulder 62 that is simply a slight protrusion in the conduit that limits the extent to which the female axial slide portion 52 can travel.

Next, adjacent to the shoulder 62 is a female spherical outlet portion 64 having an inner surface substantially free of tool marks or other friction-inducing imperfections. Nonetheless, it is possible to include stops, key-ways, and other devices to limit relative movement of the inner slider 36 and the outlet connection 38. A conduit 66 extends through the male slide portion 60 through to the female spherical outlet portion 64.

Disposed at least partially inside the spherical outlet portion 62 of the inner slider 36, is a mating male spherical inlet portion 70, which tapers down to a neck 72, and includes an outlet portion 74. The outlet connection 38 defines a conduit 76 extending through from the male spherical inlet portion 70 to the outlet 74, so that exhaust can flow from one end of to the other the decoupler 30, through the conduits 44, 58, 66, and 76. As stated above, in relation to the inlet connection 32, the male spherical inlet portion 70 can be sized, shaped, oriented, or positioned to control flow characteristics through the spherical decoupler 30. The spherical inlet portion 70 can be used alone to control internal flow characteristics or in combination with the female spherical outlet portion 64. (See description of FIGS. 23 to 25 below.) Further, baffles, vanes, and other flow controllers can be disposed in the conduits 44, 58, 66, and 76, if desired.

A machine 90 for manufacturing the spherical decoupler 30 is illustrated in FIGS. 7A and 7B, and it includes a frame 92 with actuators 94 mounted at each end to apply opposing forces using rams 132 against an elastomer 130 (or other flexible material) disposed inside a tube blank 126, which is disposed in a first die 110, as described in more detail below.

One embodiment of a method of manufacturing a spherical decoupler 30 is depicted in FIGS. 8 through 11. Stage 1 of the process is depicted in FIGS. 8 and 9. The "initial" step of Stage 1 is depicted in FIG. 8, which illustrates a first die 110 defining a first recess 112 and a second recess 114 in a mating shape of a desired finished part. In the illustrated die 110, the recess 112 includes a first tubular portion with a tubular shaped portion and a spherical shaped portion 118, and the second recess 114 also includes a tubular shaped portion and a spherical shaped portion 122. The first die 110 includes two halves so that the part can be removed after forming. In addition, the first die 110 can be described as two dies in one, or be separate dies. Consequently, the die 110 may be referred to herein as "a first die" and "a second die."

The shapes of the die recesses described herein are selected so that the resulting part has the desired finished shape. For example, a die recess for a spherical component may not itself be exactly spherical. It is also possible that further shaping of the parts will occur after they are formed as described herein.

Conduit blanks 126 are placed in the first die 110, as illustrated, and positioned against stops 128, and cylindrical shapes of elastomer 130 are positioned inside of the conduit blanks 126. Opposing rams 132 are positioned adjacent to the elastomer 130, and an appropriate interface 136, such as disks, seals, or other material, are positioned between the rams 132 and the elastomer 130 to prevent the elastomer 130 from squeezing past the rams 132 when force is applied, if desired.

Next, a force is applied to by the rams 132 to the elastomer 130. The force causes the elastomer 130 to compress and expand outwardly against the tube blanks 126 in the unsupported (recessed areas) of the spherical portions 118 and 122 until the conduit blanks 126 are drawn in an axial direction and expand to the full extent allowed by the first die 110. (See FIG. 9). The rams 132 are then retracted, the first die 110 is opened and the formed components 34 and 36 of the spherical decoupler 30 are removed.

In FIG. 10, the initial arrangement of Stage 2 is depicted. At this step, the outer slider 34 and the inner slider 36 are partially assembled with their respective slide portions 52 and 60 arranged in a sliding and telescoping relationship to form a subassembly. The outer slider 34 and the inner slider 36 subassembly are then placed in a second die 138 that matches the outer diameter and shapes of the outer slides 34 and the inner slider 36 subassembly.

Two conduit blanks 140 and 142 are then inserted into the sliders 34 and 36 subassembly either before or after being placed in the second die 138, as illustrated in FIG. 10. The conduit blanks 140 and 142, preferably have pre-formed ends 40 and 74, respectively, which would also match the shapes of recesses in the second die 138. Further, as seen by comparing FIGS. 10 and 11, the conduit blanks 140 and 142 extend beyond their respective female spherical portions, so that in the initial part of this forming stage, the elastomer 130 is protected from being forced out of the conduit blank and damaged. As the male spherical portions are formed, the extended portions of the conduit blanks 140 and 142 draw up to a finished position as parts of the male spherical portions 42 and 70. (Note that if, as described above, the first stage is performed in two separate dies, the second die 138 would then be the "third die" used in the method.)

Next, an elastomer 130 is placed in the tube blanks 140 and 142, and all the way through the parts assembly. The rams 132 then apply force directly to the elastomer 130 or to an interface if one is used, as described above. The ram force compresses the elastomer 130 to translate the axial load to a radial outward load to form the cylindrical portions and/or the male spherical portions 42 and 70, as illustrated. The rams 132 are then withdrawn and the assembled spherical decoupler 30 is removed. With this manufacturing method, the parts are formed within relatively tight tolerances and mate very well with one another because they are all formed together in Stage 2.

As stated above, the elastomer material 130 will be compressed by the rams 132 with about 90,000 of force, for example. Nonetheless, a wide range of forces is possible and the proper force can be determined based on the forming pressures needed for a given part's material properties and the desired final shapes of the parts. Preferably, the elastomer material 130 is a black polyurethane rod of suitable dimensions to match the inside diameter of the part being formed, and have a Durometer hardness of about 90, for example, but other Durometers can be used depending on the amount of force necessary to form the parts and to avoid damaging the elastomer, so it can be reused. The elastomer 130 can be damaged when it is too soft because it can flow around the parts and rams and also stick to the parts being formed. If too rigid, the elastomer 130 may not be resilient enough to return to a desirable shape for use in subsequent forming operations. The elastomer described herein is a preferred embodiment, but any material that can translate necessary forces and is flexible enough to move into recesses in a die and retain most of its volume, so it cannot be compressed to the point where it fails to transmit the required conduit forming loads, is acceptable and within the definition of "flexible material," as used herein. The elastomer material 130 will be under intense pressure when the rams 130 apply force, and it is possible to seal the elastomer material 130 with sealing wedges to prevent the elastomer material 130 from being forced around the rams 130. Other retaining devices can be used to protect the elastomer.

The rams 130 are driven by a hydraulic post that can apply an axial force of as much as about 90,000 pounds to the elastomer material 130. The elastomer material 130 translates the axial force to a radial outward pressure against the conduit blanks to form the shapes described herein. The radial outward pressure is about 30,000 psi, for making parts used in the present examples but the actual pressure needed depends on the material properties of the part being formed and the shapes into which the part will be formed.

The forming dies 110 and 138 resist the pressure applied against the conduit blanks once the desired shape is achieved. The substantially uniform outward pressure of the elastomeric material 130 results in a conduit shapes having a substantial match with the die (or "full print" geometry), which might otherwise be unattainable with a multi-hit ram or other forming methods. Further, in a preferred embodiment, by allowing at least a portion of the conduit blanks to move axially, the material forced outwardly to form the shapes does not need to stretch as much as it would if the entire conduit blank were restrained. Instead, the conduit blanks slide axially in the die and are drawn into their desired location for forming. This results in wall thicknesses in the shaped portions that are at or close to full thickness.

If desired, the inlet connection 32 and the outlet connection 38 can be further shaped, as in the example of a diameter-reducing, diameter-increasing (FIG. 18, for example), or other shaping process to match adjacent components. In this part of the process, the formed conduit or conduit blanks can be shaped at their ends before or after the other forming steps. Other optional shaping operations can be performed at this stage as well.

Illustrated generally in FIGS. 12 through 17, is an alternate embodiment of a spherical decoupler 200 in accordance with the present invention. This spherical decoupler 200 includes: an inlet connection 202, an outer slider 204, an inner slider 206, and an outlet connection 208, as above. Generally, this embodiment 200 is similar in function to the embodiment 30 described above, except that the male and female spherical portions are reversed, so that the female spherical portions are on the inlet connection 202 and the outlet connection 208, and the male spherical portions are on the outer slider 204 and the inner slider 206.

Accordingly, the inlet connection 202 defines a conduit 218 extending from an inlet 210 to a female spherical outlet portion 212 through which exhaust or other fluid can flow at high temperatures and at pressures associated with exhaust gases, for example. A neck 216 can also be formed in the inlet connection 202 to provide ample clearance for pivoting movement of an adjacent outer slider 204, as described below.

The outer slider 204 includes a male spherical inlet portion 220 that is at least partially surrounded by the female spherical outlet portion 212 of the inlet connection 202. The inner surface of the female spherical outlet portion 212 is preferably very smooth and with only minimal tool marks, so that it fits in a relatively tight mating relationship with the male spherical inlet portion 220.

The male spherical portion 220 transitions into a substantially straight female axial slide portion 222, which has any desired length and shape to fit the application. For example, the preferred cross-sectional shape is round, but the female axial slide 222 could be square or any other out-of-round shape to prevent rotation (if desired) of the outer slider 204 relative to the inner slider 206. In addition, other shapes, including elbows could be included between the male spherical portion 220 and the female axial slide portion 222. Again, the female slide portion 222, like all of the parts described herein, should be relatively free of tool marks that can reduce friction and poor fit. Further, the central slider portion of the spherical decoupler 200 is depicted with the female portion on the left and the male portion on the right, but these can be reversed, if desired. Other components can also be added in this area, if desired.

The outer slider 204 defines a conduit 228 extending through the male spherical inlet portion 220 and the female axial slide portion 222.

Disposed at least partially inside the female axial slide portion 222 is a male slide portion 230 of the inner slider 206. The length, diameter, and cross-sectional shape of the exterior of the male slide portion 230 is selected to match the female axial slide portion 222, but the interior conduit 236 can be selected to control flow characteristics through the spherical decoupler 200. In some embodiments, the parts 222 and 230 are sized to provide at least one inch of sliding movement, but other lengths of movement are possible.

To the right (as illustrated) of the male slide portion 230 is an optional shoulder 232 that is simply a slight protrusion in the conduit that limits the extent to which the female axial slide portion 222 can travel.

Next, adjacent to the shoulder 232 is a male spherical outlet portion 234 (FIGS. 16 and 17) having an inner surface substantially free of tool marks or other friction-inducing imperfections. Nonetheless, it is possible to include stops and key-ways to limit relative movement of the inner slider 206 and the outlet connection 208. A conduit 236 extends through the male slide portion 230 through to the male spherical outlet portion 234.

The male spherical outlet portion 234 of the inner slider 206, is disposed at least partially inside a mating female spherical inlet portion 240, which tapers down to a neck 242, and includes an outlet portion 244. The outlet connection 208 defines a conduit 246 extending through from the female spherical inlet portion 240 to the outlet 244, so that exhaust can flow from one end of to the other the spherical decoupler 200, through the conduits 218, 228, 236, and 246.

In addition, the embodiment described above can include a sleeve 250 that is made of a relatively flexible material such as fabric, foil, or rubber, for example, and can shield a spherical decoupler 30 and 200 from dirt and debris, as well as provide a convenient surface for displaying colors, logos, instructions, or other graphic material.

To accommodate the different arrangement of male and female spherical components, a different method of forming the spherical decoupler 200 is provided.

Figure 20:
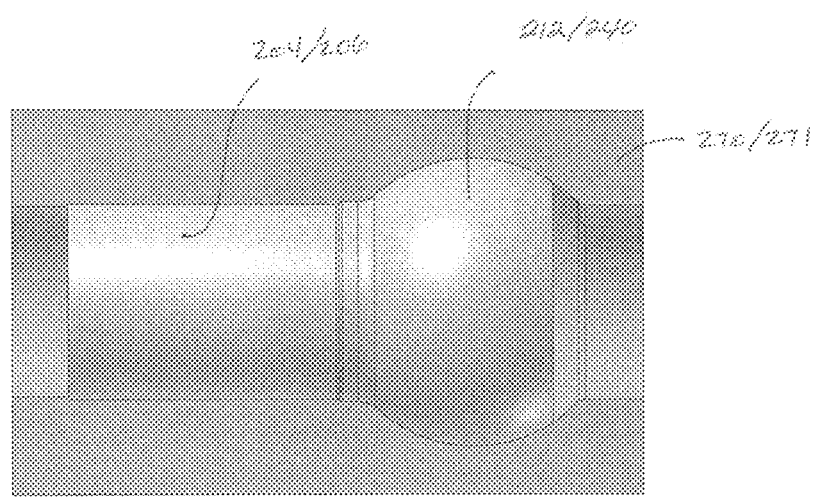
FIG. 20 is a side view of one of the conduits of FIG. 19 after forming in accordance with the present invention.

One embodiment of a method of manufacturing a spherical decoupler 200 is depicted in FIGS. 18 through 22. Stage 1 of the process is depicted in FIGS. 18 through 20. The results of an "initial" step of Stage 1 is depicted in FIG. 18, which illustrates two conduit blanks 291 with the conduit blank 291 on the right shaped to slide into the blank 290 on the left. The conduit blanks 290 are then placed in first dies 270 and 271, with each die 270 and 271, defining a first recess 272 and a second recess 274 in the shape of a desired finished part. In the illustrated dies 270 and 271, the recess includes a first tubular portion 274 with a tubular shaped portion and a spherical shaped portion 272. The dies 270 and 271 include two halves, so that the part can be removed after forming.

Conduit blanks 290 and 291 are placed in respective dies 270 and 271, as illustrated, and positioned as illustrated and cylindrical shapes of elastomer (not illustrated in this embodiment) are positioned inside of the conduit blanks 290 and 291. Opposing rams are positioned adjacent to the elastomer. An appropriate interface, such as disks, seals, or other material, can be positioned between the rams and the elastomer to prevent the elastomer from squeezing past the rams when force is applied, but this is not necessary in all applications.

Next, a force is applied to by the rams to the elastomer. The force causes the elastomer 130 to compress and expand outwardly against the tube blanks 290 and 291 in the unsupported (recessed) spherical portions 272 until the conduit blanks 290 and 291 are drawn into position and expand to the full extent allowed by the recess in the die 270. (See FIG. 20.) The rams are then retracted, the dies 270 and 271 are opened and the formed spherical outer slider 204 and the inner slider 206 of the decoupler 200 are removed.

Figure 21:
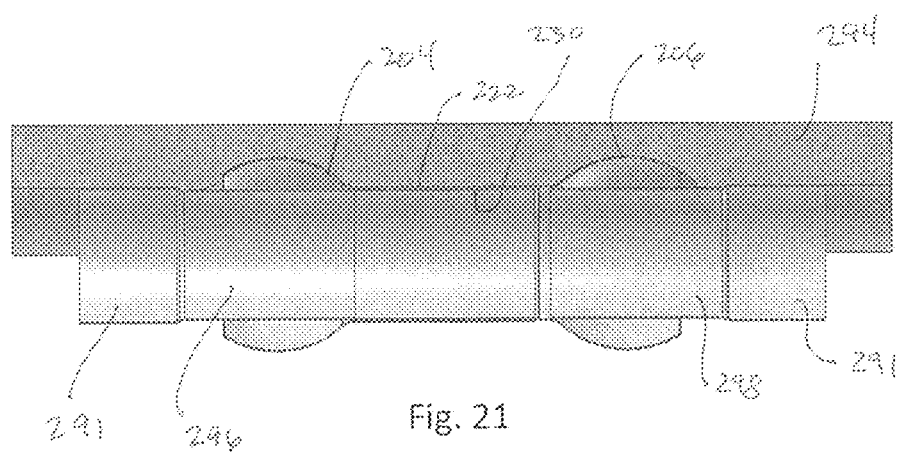
FIG. 21 is a side cross sectional view of the conduit blanks of FIG. 19 in a subassembly arrangement and placed partially inside a pair of opposing female spherical portions of conduits.

In FIG. 21, the initial arrangement of Stage 2 is depicted. At this step, the outer slider 204 and the inner slider 206 are partially assembled with their respective slide portions 222 and 230 arranged in a sliding and telescoping relationship to form a subassembly. The outer slider 204 and the inner slider 206 subassembly are then placed in a die 294 that matches the outer diameter and shapes of the outer slider 204 and the inner slider 206 subassembly, as illustrated.

Figure 22:
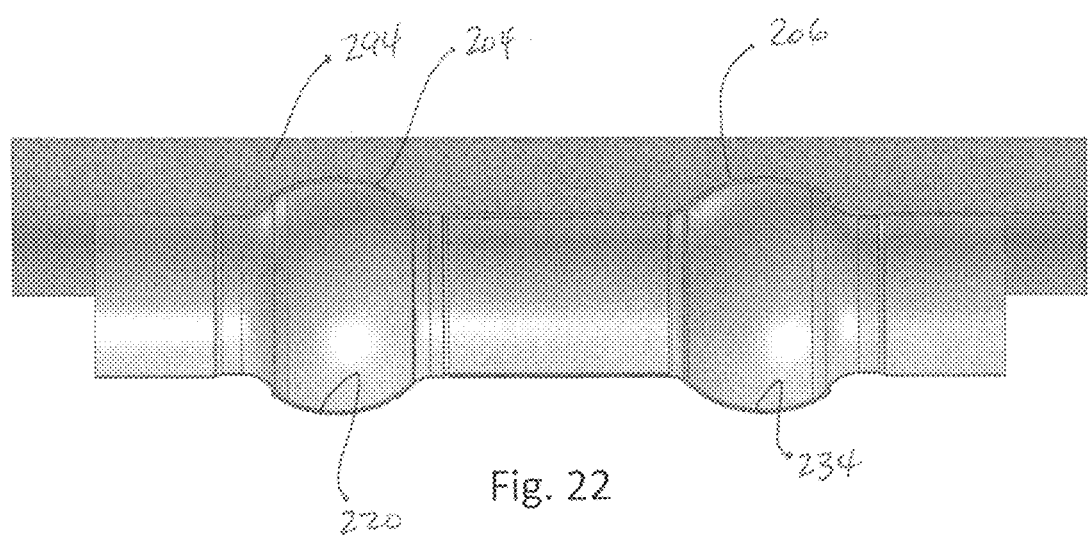
FIG. 22 is a side view of an alternate embodiment of a spherical decoupler prior to being fully removed from a die.

Two conduit blanks 296 and 298 are inserted into the sliders 204 and 206 subassembly either before or after being placed in second a die 294. The conduit blanks 296 and 298, preferably have pre-formed ends 291, respectively, which would also match the shapes of recesses in the second die 294. Further, the conduit blanks 296 and 298 extend beyond their respective female spherical portions so that in the initial portion of this forming stage the elastomer is protected. As the male spherical portions are formed, the extended portions of the conduit blanks 296 and 298 draw up to a finished position as parts of the male spherical portions 220 and 234, as seen in FIG. 22 (Note that if, as described above, the second stage can be performed in two separate dies.)

Next, an elastomer (not illustrated in this embodiment) is placed in the tube blanks 296 and 298, and all the way through the parts assembly. The rams then apply force directly to the elastomer or to an interface if used, as described above. The force on the compresses the elastomer to translate the axial load to a radial outward load to form the cylindrical portions and/or the male spherical portions 220 and 234, as illustrated. The rams are then withdrawn and the assembled spherical decoupler 200 is removed. With this manufacturing method, the parts are formed within relatively tight tolerances and mate very well with one another because they are all formed together in Stage 2.

Figure 23:
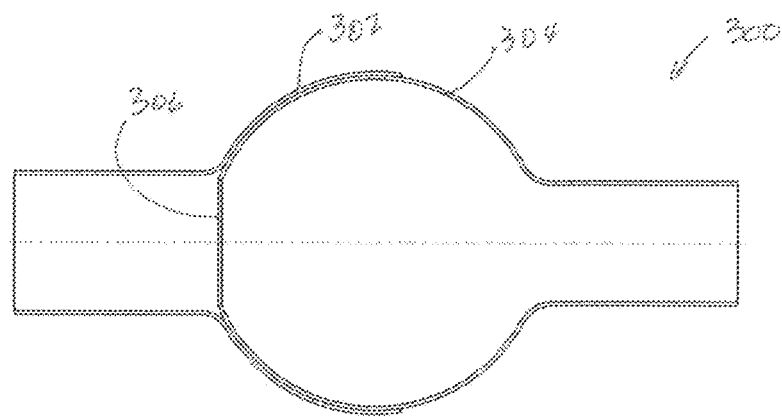
FIG. 23 is of a side cross sectional view of an alternate embodiment of a spherical decoupler used to control flow through the spherical decoupler in accordance with the present invention.
Figure 24:
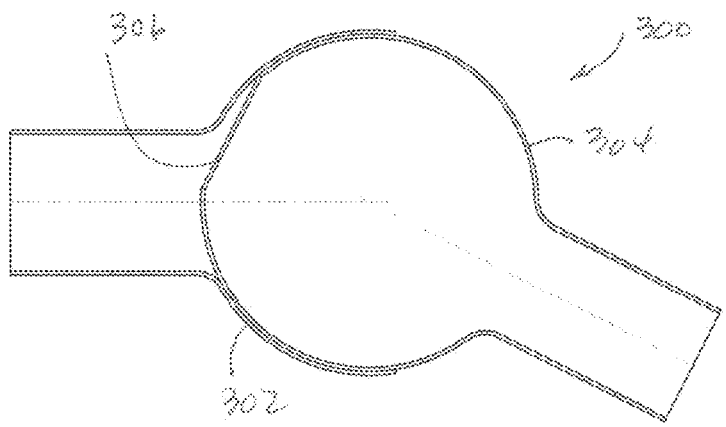
FIG. 24 is a side cross sectional view of the spherical decoupler of FIG. 22 in a partially closed position.
Figure 25:
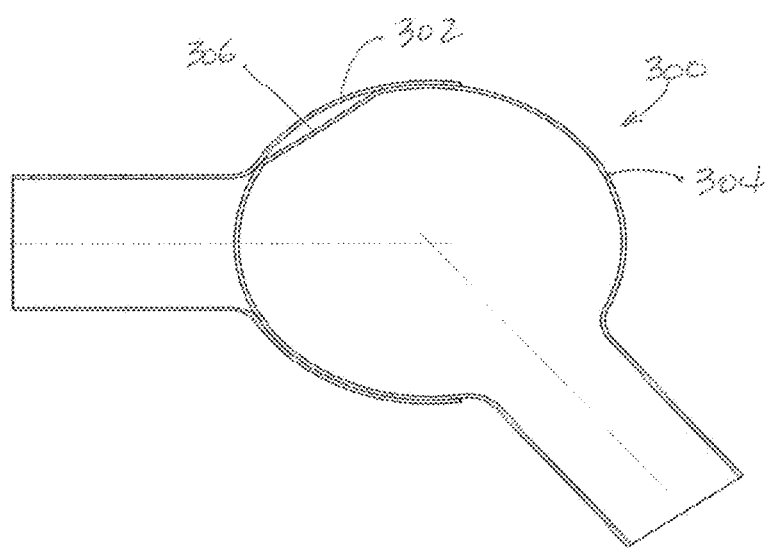
FIG. 25 is a side cross sectional view of the spherical decoupler of FIG. 22 is a closed position.

Yet another embodiment of the present invention is partially depicted in FIGS. 23 to 25. In this embodiment, a spherical decoupler 300 includes a female spherical portion 302 essentially as described above, but the male spherical portion 304 has an opening 306 that is restricted as compared to those described above. As seen in FIG. 23, when the female spherical portion 302 and the male spherical portion 304 are relatively axially aligned, the opening 306 is in a fully opened position, but as the two portions 302/304 pivot relative to one another, the opening 306 is in a partially closed position (FIG. 24) or even fully closed position (FIG. 25). This embodiment can be used to control fluid flow through the spherical decoupler 300 either by deliberately pivoting the two portions 302 and 304 relative to one another or as a safety mechanism for at least partially closing the spherical decoupler 300 in the event of a failure that would cause misalignment of or catastrophic pivoting movement between the two portions 302 and 304. The size of the opening 306 relative to the diameter of the conduit (as well as other dimensional factors) can be selected to control the degree to which the opening 306 is closed as the two portions 302 and 304 pivot relative to one another. The opening 306 can also be positioned or shaped so that the opening 306 is only partially or fully closed when relative pivoting or rotational movement between the portions 302 and 304 occurs in some directions, but not others.

Further, the direction of fluid flow in the spherical decoupler 300 can be reversed if desired for fluid flow characteristics. The spherical decoupler 300 can be mated with the type of spherical decoupler components described above or with a similar flow controlling spherical decoupler 300. Suitable gaskets and seals between the male and female portions 302 and 304 can also be used to reduce leaks.

It should be apparent to those of ordinary skill in the art that the embodiments described herein can be modified without departing from the principles thereof, and no unnecessary limitations from the preceding description should be read into the following claims.

The invention claimed is:

1. A method for forming a spherical decoupler conduit joint, the method comprising the steps of:
at least partially restraining a first conduit blank in a first forming die, and the first forming die defines a tubular recess portion and a spherical recess portion;
at least partially restraining a second conduit blank in a second forming die, and the second forming die defines a tubular recess portion and a spherical recess portion;
inserting a flexible material in the first conduit blank;
compressing the flexible material to force the flexible material against the first conduit blank to; force a portion of the first conduit blank outward into engagement with the tubular recess portion of the first die, and another portion of the first conduit blank outward into contact with the spherical recess portion of the first forming die to form an outer slider portion having a tubular portion and a spherical portion;
inserting a flexible material in the second conduit blank;

compressing the flexible material to force the flexible material against the second conduit blank to; force a portion of the second conduit blank outward into engagement with the tubular recess portion of the second die, and another portion of the second conduit blank outward into contact with the spherical recess portion of the second forming die to form an inner slider having a tubular portion and a spherical portion;

inserting the tubular portion of the inner slider into the tubular portion of the outer slider to form a subassembly;

inserting a third conduit blank into the outer slider;

inserting a fourth conduit blank into the inner slider;

placing the subassembly, the third conduit blank, and the fourth conduit blank into a third die, and the third die defines a recess substantially matching the shape of the subassembly;

inserting a flexible material into the third conduit blank and the fourth conduit blank;

compressing the flexible material against the third conduit blank to; expand at least a portion of the third conduit blank outward into engagement with at least a portion of the outer slider to form a connection inlet, and against the fourth conduit blank to expand at least a portion of the fourth conduit blank outward into engagement with at least a portion of the inner slider to form a connection outlet; and removing the spherical decoupling conduit joint from the third die.

2. The method of claim 1, wherein the first die and the second die are joined as a single die.

3. The method of claim 1, and further comprising the step of:

forming an inlet connector shape on the inlet connection.

4. The method of claim 1, and further comprising the step of:

forming an outlet connector shape on the outlet connection.

5. The method of claim 1, and wherein the step of:

at least partially restraining a first conduit blank in a first forming die comprises the steps of:

restraining a portion of the first conduit blank to prevent axial movement of the conduit blank within the first die; and permitting slidable movement of a slidably unrestrained portion of the first conduit blank to permit axial movement of the slidably unrestrained portion of the first conduit blank during the step of compressing the flexible material.

6. The method of claim 1, and wherein the step of:

at least partially restraining a second conduit blank in a second forming die comprises the steps of:

restraining a portion of the second conduit blank to prevent axial movement of the conduit blank within the second die;

permitting slidable movement of a slidably unrestrained portion of the second conduit blank to permit axial movement of the slidably unrestrained portion of the second conduit blank during the step of compressing the flexible material.

7. The method of claim 1, and further comprising the step of:

defining the spherical portion of the outer slider to limit pivoting movement of the inlet connection.

8. The method of claim 1, and further comprising the step of:

defining the spherical portion of the inner slider to limit pivoting movement of the outlet connection.

* * * * *